United States Patent [19]
Yokota et al.

[11] Patent Number: 5,543,124
[45] Date of Patent: Aug. 6, 1996

[54] PROCESS FOR REDUCING NITROGEN OXIDES

[75] Inventors: Koji Yokota; Masayuki Fukui; Toshiyuki Tanaka, all of Aichi, Japan

[73] Assignee: Kabushiki Kaisha Toyota Chuo Kenkyusho, Aichi-ken, Japan

[21] Appl. No.: 326,219

[22] Filed: Oct. 20, 1994

[30] Foreign Application Priority Data

Jun. 30, 1994 [JP] Japan .................................. 6-173219

[51] Int. Cl.$^6$ .................................................... B01J 8/02
[52] U.S. Cl. ..................... 423/239.1; 423/213.5
[58] Field of Search .................... 423/213.2, 213.5, 423/239.1

[56] References Cited

U.S. PATENT DOCUMENTS

| | | | |
|---|---|---|---|
| 4,117,081 | 9/1978 | Inaba et al. | 423/239.1 |
| 4,963,332 | 10/1990 | Brand et al. | 423/235 |
| 5,023,063 | 6/1991 | Stiles | 423/239.1 |
| 5,041,270 | 8/1991 | Fujitani et al. | 423/213.2 |
| 5,272,871 | 12/1993 | Oshima et al. | 60/274 |

OTHER PUBLICATIONS

Patent Abstracts of Japan, JP-A-62 097 630, May 7, 1987.
Patent Abstracts of Japan, JP-A-01 139 145, May 31, 1989.
Patent Abstracts of Japan, JP-A-05 168856, Jul. 2, 1993.
Patent Abstracts of Japan, JP-A-05 168 860, Jul. 2, 1993.
Patent Abstracts of Japan, JP-A-54 090 064, Jul. 17, 1979.
Patent Abstracts of Japan, JP-A-03 199 640, Aug. 30, 1991.
Patent Abstracts of Japan, JP-A-04 284 117, Oct. 8, 1992.

*Primary Examiner*—Gary P. Straub
*Assistant Examiner*—Thomas G. Dunn, Jr.
*Attorney, Agent, or Firm*—Oblon, Spivak, McClelland, Maier & Neustadt, P.C.

[57] ABSTRACT

A process for efficiently reducing nitrogen oxides in exhaust gases including excess oxygen. The process includes intermittently introducing a reducing agent, such as hydrogen and carbon monoxide, for reducing nitrogen oxides to a reducing catalyst, such as platinum, disposed in an exhaust gas passage while maintaining an oxygen excess condition. The reducing agent is intermittently introduced in a manner to satisfy the following equation:

$[NO_x] < [H_2] + [CO]$, wherein $[H_2]$, $[CO]$ and $[NO_x]$ are molar concentrations of hydrogen, carbon monoxide and nitrogen oxides, respectively. The reducing catalyst may include a transition metal, an alkaline metal and/or an alkaline earth metal.

13 Claims, 3 Drawing Sheets

PROCESS FOR REDUCING NITROGEN OXIDES

BACKGROUND OF THE INVENTION

1. Field of the Invention

The present invention relates to a process for reducing nitrogen oxides ($NO_x$), in which at least nitrogen oxides contained in exhaust gases emitted from internal combustion engines of automobiles, etc., can be efficiently reduced, the amount of oxygen in exhaust gases being larger than the stoichiometric amount of oxygen required to oxidize components to be oxidized therein, such as hydrocarbons (HC), carbon monoxide (CO), hydrogen ($H_2$), etc.

2. Description of Related Art

Carbon dioxide ($CO_2$) which is contained in exhaust gases emitted from internal combustion engines of automobiles, etc. has recently become an issue in view of protection of global environment. As one of solutions to the problem, a so-called lean-burn engine has gained the increasing prospect, in which a fuel is lean-burned in an atmosphere of excess oxygen. In the lean-burn engine, high combustion efficiency of a fuel decreases the consumption of a fuel and thus suppresses the emission of $CO_2$ which is a combustion product of a fuel.

A conventional three-way catalyst simultaneously oxidizes and reduces carbon monoxide (CO), hydrocarbons (HC) and nitrogen oxides ($NO_x$) in the exhaust gas of a stoichiometric air-fuel ratio. However, the three-way catalyst does not exhibit sufficient ability to reduce nitrogen oxides in the exhaust gas which contains excess oxygen in the amount which is larger than a stoichiometric amount required to oxidize the components to be oxidized in the exhaust gas, i.e., in the oxygen rich atmosphere. For this reason, the improvement of a process for reducing nitrogen oxides has been sought in which the nitrogen oxides can be reduced even in the case that the exhaust gas contains excess oxygen.

As a process for reducing $NO_x$ in an exhaust gas containing excess oxygen, Japanese Laid-Open Patent Application (Kokai) No. 62-97,630 discloses a two-catalyst system. In this system, the exhaust gas flows into the first catalyst, one of two catalysts arranged in parallel, to adsorb $NO_x$, and when the catalyst is saturated with adsorbed $NO_x$ and $NO_x$ adsorption capacity is decreased, the flowing of the exhaust gas into the first catalyst is stopped and simultaneously switched to the second catalyst, and a reducing agent such as hydrogen or the like is allowed to flow into the first catalyst to reduce the $NO_x$ adsorbed.

The present inventors previously developed a technique in which a catalyst for the oxidation of HC, CO and NO, products of incomplete combustion of a fuel, is provided upstream in an exhaust gas passage, a catalyst for reducing $NO_2$ formed by the oxidation is provided downstream in the exhaust gas passage, and hydrogen gas ($H_2$) is fed from upstream of the reduction catalyst to thereby reduce $NO_x$ effectively (Japanese Laid-Open Patent Application (Kokai) No. 5-168,856).

Further, as a catalyst which shows a relatively high ability to reduce nitrogen oxides even under the oxygen rich atmosphere, there were proposed a zeolite catalyst in which a transition metal such as copper (Cu) or the like is supported on zeolite by ion exchange as disclosed in Japanese Laid-Open Patent Application (Kokai) No. 1-139,145, and a platinum catalyst in which a noble metal such as platinum (Pt) or the like is supported on alumina ($Al_2O_3$) as disclosed in Japanese Laid-Open Patent Application (Kokai) No. 5-168,860.

However, in the process of above-mentioned Japanese Laid-Open Patent Application (Kokai) No. 62-97,630, there is a problem that the device itself is complicated since the two exhaust gas passages are necessary and they have to be switched over according to the amount of the $NO_x$ adsorbed. Another problem is that when $H_2$ is fed for regenerating the catalyst, the catalyst is rendered in a reductive atmosphere, so that $NO_x$ may react with $H_2$ to form ammonia ($NH_3$).

In the process of the above-mentioned Japanese Laid-Open Patent Application (Kokai) No. 5-168,856, where $H_2$ is continuously fed, the larger the amount of $H_2$ is, the more efficiently $NO_x$ is reduced. However, when the amount of $H_2$ fed is too large, $H_2$ is reacted with oxygen, and the temperature of the catalyst increases. Because the reaction of $H_2$ and oxygen is accelerated, $NO_x$ reduction reaction is suppressed and $H_2$ utilization efficiency decreases.

The above-mentioned zeolite catalyst in Japanese Laid-Open Patent Application (Kokai) No. 1-139,145 involves the following problems.

(1) The heat resistance is poor.

(2) Although hydrocarbons (HC) are used as a reducing agent of $NO_x$, the hydrocarbons emitted in a non-reacted state are not good to the human body.

(3) When hydrocarbons in the exhaust gas or fuels such as a light oil, gasoline, etc. are used as a reducing agent, only limited kinds of hydrocarbons can be used as a reducing agent, since some hydrocarbons are easy to react with $NO_x$, but others are difficult to react with $NO_x$. Accordingly, the hydrocarbons used as the reducing agent cannot reduce $NO_x$ efficiently.

SUMMARY OF THE INVENTION

The present inventors have conducted earnest investigations in order to solve the problems associated with the prior art and have performed a variety of systematic experiments.

They have taken the following items into consideration.

(1) In order to reduce $NO_x$ in oxygen rich atmosphere, an appropriate reducing agent of $NO_x$ should be used.

(2) Hydrogen ($H_2$) and/or carbon monoxide (CO) is a suitable reducing agent of $NO_x$, which can be easily produced and which is useful as a reducing agent for reducing $NO_x$ in a mobile generation source such as automobiles and a small-scale generation source, and which can be easily removed.

Through extensive experiments, they have found a catalyst for reducing nitrogen oxides in which $H_2$ and/or CO can be used as the reducing agent, and have found that when $H_2$ and/or CO is intermittently introduced into the catalyst for reducing nitrogen oxides, the reduction activity improves drastically.

Specifically, they have found that the relationship between a concentration of $H_2$ and/or CO and a $NO_x$ conversion ratio is non-linear. That is, within a predetermined $H_2$ and/or CO concentration range, as the concentration of $H_2$ and/or CO increases, the $NO_x$ conversion efficiency rapidly increases improportionately. When the concentration reaches a certain high level, the reduction activity of $H_2$ and/or CO is saturated, and when it becomes still higher, the reduction activity rather decreases. After having conducted various experiments, the present inventors have found that the $NO_x$ conversion efficiency is more effectively improved by intermittently feeding $H_2$ and/or CO as a reducing agent at a concentration higher than the predetermined concentration, than by continuously feeding $H_2$ and/or CO at the predetermined concentration, the time-averaged feeding amount in intermittent feeding and continuous feeding being the same.

Accordingly, it is an object of the present invention to provide a process for reducing nitrogen oxides ($NO_x$) which can reduce efficiently at least nitrogen oxides contained in an exhaust gas containing excess oxygen, the amount of the oxygen being larger than a stoichiometric amount of oxygen required to oxidize the components to be oxidized in the exhaust gas.

Another object of the present invention is to provide a process for reducing nitrogen oxides by intermittently introducing a reducing agent for reducing nitrogen oxides to a reducing catalyst disposed in an exhaust gas passage, while saving the reducing agent and maintaining the oxygen excess condition, thereby preventing the generation of ammonia and efficiently reducing nitrogen oxides in the exhaust gas.

Still another object of the present invention is to provide a process for reducing nitrogen oxides which can efficiently reduce nitrogen oxides in an exhaust gas by using a reducing agent that can be easily produced.

Still another object of the present invention is to provide a process for reducing nitrogen oxides in which the reducing agent is hydrogen ($H_2$) and/or carbon monoxide (CO), and the reducing agent is introduced into the catalyst for reducing nitrogen oxides under the conditions that satisfy the following equation:

$$[NO_x] < [H_2] + [CO]$$

wherein $[H_2]$, $[CO]$ and $[NO_x]$ are molar concentrations of the hydrogen, carbon monoxide and nitrogen oxides, respectively.

The above and other objects, features and advantages of the present invention will become more apparent from the following description when taken in conjunction with the accompanying drawings in which the preferred embodiments of the invention are shown by way of illustrative examples.

DETAILED DESCRIPTION OF THE INVENTION

Figure 1:
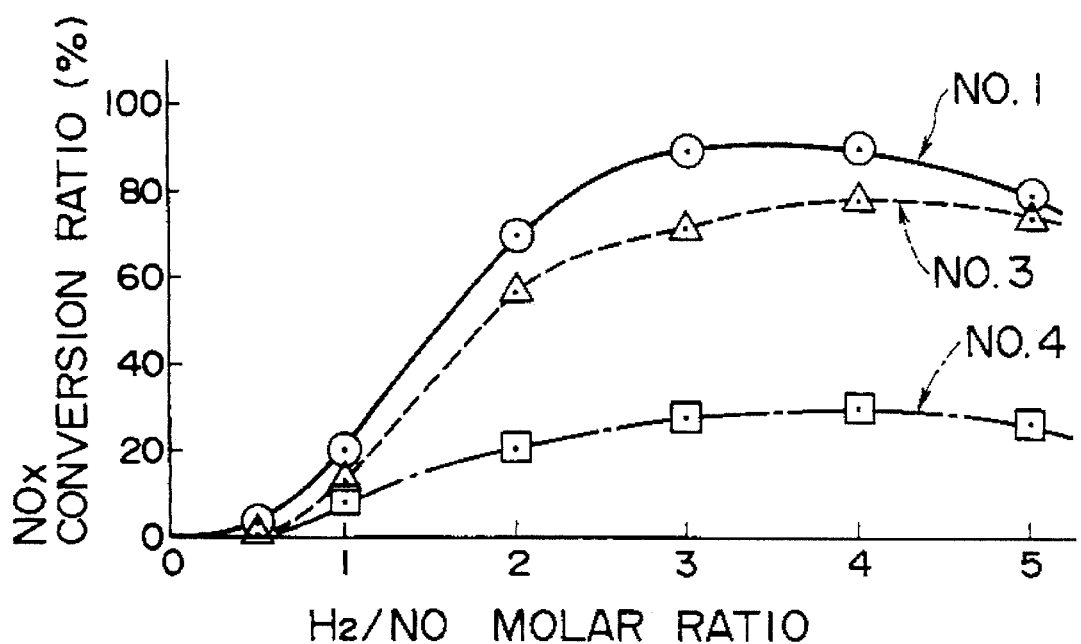
FIG. 1 is a graph showing a $NO_x$ conversion ratio relative to an $H_2$/NO ratio.

The present inventors have found the following facts by conducting experiments during their investigations on a relationship between the concentration of a reducing agent and the rate at which the nitrogen oxides are reduced. For example, in case NO as a nitrogen oxide is reduced by hydrogen ($H_2$) as a reducing agent, the $NO_x$ conversion efficiency abruptly and improportionately increases when the $H_2$ concentration increases within the predetermined range. This relation will be later described in more detail. Some of the results are shown in FIG. 1. When the concentration of $H_2$ becomes high, the reduction activity of $H_2$ is saturated. As the concentration becomes even higher, the reduction activity tends to decrease. Similar results are obtained when carbon monoxide (CO) is used as a reducing agent.

When the reducing agent for reducing nitrogen oxides is continuously fed into a catalyst, the temperature of the catalyst for reducing nitrogen oxides increases due to the heat induced by the chemical reaction inside the catalyst. It is known that when $H_2$ and/or CO is used as a reducing agent, the reductive conversion efficiency of the nitrogen oxides gradually decreases as the temperature of the catalyst increases. To prevent this undesirable temperature increase, a new treatment such as using a means of cooling the catalyst or the like is required.

On the other hand, if the reducing agent is intermittently introduced into the catalyst, the chemical reaction in the catalyst is suspended for a certain period of time. Therefore, during this suspended time, the catalyst can be cooled and the increase in the temperature can be restrained, making it possible to prevent the decrease in the reductive conversion efficiency of nitrogen oxides.

As a method for intermittently introducing a reducing agent into a catalyst for reducing nitrogen oxides while maintaining the condition of excess oxygen, there is, for example, a method in which the reducing agent is fed regularly at predetermined time intervals. However, the method is not particularly limited as far as it can utilize the non-linear relationship between the concentration of the reducing agent for reducing nitrogen oxides and the concentration of nitrogen oxides (FIG. 1), that is, as far as the relationship between them is in the range such that $NO_x$ conversion efficiency does not decrease. In addition, the method is not particularly limited as far as nitrogen oxides can be efficiently removed with a limited amount of the reducing agent in a certain period of time, and as far as the heat generation due to the secondarily occurring oxidation can be suppressed as effectively as possible.

The time interval at which the reducing agent is fed intermittently varies depending on the kind and the amount of the reducing agent to be fed, the concentration of $NO_x$, the amount of gas to be treated, the kind of catalyst and the volume of $NO_x$ adsorbed. However, when the feeding time (hereinafter referred to as "on-time") and the non-feeding time (hereinafter referred to as "off-time"; to suppress the heat generation of the catalyst, the amount of the reducing agent fed at the off-time is preferably at least 1/10 or less of that of the on-time) are defined to be one cycle, the cycle should be set from 1 second to 10 minutes, preferably from 2 seconds to 1 minute. Within this range, the reducing agent can be fed at a high concentration, and catalyst cooling time can be secured. Further, it is preferable that a duty ratio (that is, on-time/1 cycle) is within the range of from 10 to 90%. Still further, when the off-time is shorter than 0.5 seconds, the catalyst chemical reaction heat accumulates in the catalyst, and when the off-time is longer than 10 minutes, the reaction does not proceed and the amount of $NO_x$ passing through the catalyst and is emitted outside increases undesirably. Accordingly, the off-time should be preferably within the range of from 0.5 seconds to 10 minutes.

The exhaust gas containing excess oxygen in the present invention will be described below in which the amount of oxygen is larger than the stoichiometric amount of oxygen required to oxidize the components to be oxidized in the exhaust gas.

Examples of an ordinary exhaust gas containing components such as NO, $O_2$, CO, $H_2$ and HC will be explained in detail below. As an index showing whether or not the exhaust gas contains excess oxygen, an excess oxygen ratio S represented by the following equation (1) is defined using concentrations of oxidizing ingredients such as NO and $O_2$ and ingredients to be oxidized such as CO, $H_2$ and HC ($C_nH_{2n}$:olefins, and $C_nH_{2n+2}$:paraffins).

$$S=([NO]+2[O_2])/([CO]+[H_2]+3n[C_nH_{2n}]+(3n+1)[C_nH_{2n+2}]) \quad (1)$$

wherein n is an integer, and [ ] represents the molar concentration amount per unit volume of an exhaust gas) or a partial pressure of each components in parentheses.

In equation (1), when S exceeds 1, the amount of oxygen in the exhaust gas is larger than the stoichiometric amount required to oxidize the components to be oxidized in the exhaust gas. This exhaust gas is defined as the oxygen excess condition.

It is especially preferred that the reducing agent for reducing nitrogen oxides is hydrogen ($H_2$) and/or carbon monoxide (CO). When the reducing agent is hydrogen and/or carbon monoxide, the nitrogen oxides in the exhaust gas can be reduced efficiently. When CO and $H_2$ are introduced, equation (1) is required to satisfy S>1. In the case of S≦1, undesirable CO is released as generated in the exhaust gas, or $NO_x$ is reduced into $NH_3$, which are undesirable.

In this case, it is preferable that the reducing agent be introduced into the catalyst for reducing nitrogen oxides under the conditions that satisfy the following equation (2).

$$[NO_x]<[CO]+[H_2] \quad (2)$$

wherein [CO], [$H_2$] and [$NO_x$] represent molar concentrations of carbon monoxide, hydrogen and nitrogen oxides. When equation (2) is satisfied, nitrogen oxides can be reduced efficiently.

The catalyst for reducing nitrogen oxides used in this case is preferably a catalyst having a honeycomb structure. By using such a catalyst, the reaction heat generated inside the catalyst can be efficiently released, whereby the temperature of the catalyst is kept low, and the $NO_x$ conversion efficiency remains high.

In order to maintain the atmosphere of excess oxygen in feeding a reducing agent, a means such as an $O_2$ sensor may be provided downstream of the $NO_x$ reducing catalyst in the exhaust gas passage. The $O_2$ sensor detects the concentration of oxygen in the exhaust gas, thereby controlling the amount of the reducing agent to be fed into the catalyst based on the detected value, in order to maintain the condition of excess oxygen.

The catalyst for reducing nitrogen oxides in the present invention will be described hereinafter.

When the amount of excess oxygen is close to the stoichiometric amount, that is, when S in the above-mentioned equation (2) is close to 1, the reaction of the oxidizing components and the components to be oxidized proceeds neither more nor less. However, when oxygen is present in too large an amount (S>1), the components to be oxidized tend to react with oxygen ($O_2$). Therefore, in order to reduce $NO_x$, it is necessary that the reaction of $NO_x$ and the components to be oxidized is selectively advanced by suppressing the reaction of oxygen and the components to be oxidized. A catalyst by which the reaction of the components to be oxidized and $NO_x$ is selectively advanced by suppressing the reaction between oxygen and the components to be oxidized is the catalyst for reducing nitrogen oxides in the present invention.

When a CO gas or a mixed gas of CO and $H_2$ is used as the reducing agent for reducing nitrogen oxides, it is preferable that the catalyst for reducing nitrogen oxides has a structure in which around a catalytically active site of platinum which activates oxygen, an oxidation inhibitor which suppresses the oxidative degradation of the active site is provided. Examples of such an ingredient include alkali metals such as lithium (Li), sodium (Na), rubidium (Rb) and potassium (K); alkaline earth metals such as magnesium (Mg), calcium (Ca), strontium (Sr) and barium (Ba), and transition metals such as chromium (Cr), molybdenum (Mo), tungsten (W), niobium (Nb), iridium (Ir) and rhenium (Re), among which molybdenum is most preferable. They may be used either individually or in combination.

When hydrogen is used as a reducing agent for reducing nitrogen oxides, nitrogen oxides can be efficiently reduced. Here, it is preferable that a catalyst for reducing nitrogen oxides comprises a porous carrier of at least one material selected from the group consisting of silica, zeolite and alumina, and platinum loaded on the porous carrier. Thus, nitrogen oxides can be reduced efficiently.

When a component which occludes nitrogen oxides is further added to the catalyst for reducing nitrogen oxides, nitrogen oxides are occluded in the catalyst for reducing nitrogen oxides while the feeding of the reducing agent is suspended. This helps increasing the concentration of the nitrogen oxides in the catalyst. Accordingly, if the reducing agent for reducing nitrogen oxides is intermittently fed, a synergistic effect takes place for reducing nitrogen oxides. Further, since the above-mentioned reaction proceeds in an atmosphere of excess oxygen, undesired ammonia ($NH_3$) is not formed even when $H_2$ is used as a reducing agent.

For this catalyst to have further ability to occlude nitrogen oxides, at least one component selected from the group consisting of alkali metals and alkaline earth metals may be additionally loaded onto the catalyst.

The reason why nitrogen oxides in the exhaust gas can be reduced by the process for reducing nitrogen oxides in the present invention is presumed to be as follows.

In a so-called conventional three-way catalyst in which the oxidizing components and the components to be oxidized in the exhaust gas can be reacted neither more nor less in an atmosphere of oxygen in an amount close to the stoichiometric amount, carbon monoxide as the component to be oxidized acts also as a reducing agent. However, in this conventional three-way catalyst, $H_2$ and/or CO is higher in selective reactivity with $O_2$ than HC in an atmosphere of excess oxygen. Accordingly, the oxidation of $H_2$ or CO into $CO_2$ or $H_2O$ proceeds preferentially in the reaction with activated $O_2$, and it is difficult for the selective reduction of $NO_x$ with $H_2$ and/or CO to occur.

In view of the foregoing, the reaction between the components to be oxidized and $O_2$ has to be suppressed so that $NO_x$ reduction selectively occurs. Since the susceptibility of the oxidation reaction is $H_2$>CO>HC, the reaction is to be conducted at least below the temperature for the oxidation reaction of HC. Besides, when $H_2$ alone is used as the reducing agent, the temperature should be below the temperature for the oxidation reaction of CO. To prevent CO and HC from being emitted, it is preferable that an appropriate oxidation catalyst be provided upstream of the exhaust gas flow passage to oxidatively purify CO and HC in advance.

In the catalyst for reducing nitrogen oxides which is used in the present invention, an inhibitor which suppresses the activation of $O_2$ even in an atmosphere of excess oxygen is present in the vicinity of platinum which is a catalytically active site. Consequently, when CO is contained as a reducing agent, the oxidizing activity of platinum is suppressed, and therefore, nitrogen oxides can be reduced with hydrogen and/or carbon monoxide. Since the inhibitor which suppresses the oxidation can decrease the amount of oxygen in the vicinity of the catalytically active site by electronical interaction or by adsorption or desorption of $O_2$, the oxidation of the catalytically active site can be suppressed.

Hydrogen and/or carbon monoxide as a reducing agent that co-exist are those contained in the exhaust gas or carbon monoxide which is generated by modifying hydrocarbons included in a fuel or an exhaust gas with a partial oxidation catalyst or the like. In the production of hydrogen, the electrolysis of water can be utilized.

As the partial oxidation catalyst, a porous carrier such as zeolite, silica-alumina or alumina can be used individually. Also available are a catalyst in which a noble metal such as platinum or rhodium is loaded on the porous carrier, and a catalyst in which a transition metal such as copper, iron, cobalt or nickel is further loaded on the catalyst.

The alkali metal and/or the alkaline earth metal also acts as an occlusion agent for reducing nitrogen oxides. That is, through an acid-base reaction with at least one element of alkali metals and alkaline earth metals loaded on the catalyst for reducing nitrogen oxides, nitrogen oxides in the exhaust gas are temporarily occluded in the form of nitric acid salts or nitrous acid salts of these elements while the introduction of the reducing agent for reducing nitrogen oxides is suspended. Further, while the reducing agent is adequately introduced after suspension, the occluded nitrogen oxides are reduced with hydrogen and/or carbon monoxide as the reducing agent to form nitrogen ($N_2$), water ($H_2O$) and carbon dioxide ($CO_2$).

The total amount of the alkali metal and the alkaline earth metal to be loaded on the catalyst is preferably within the range of 0.001 to 15 by molar ratio with respect to the amount of platinum loaded on the catalyst.

When the amount of the alkali metal loaded is less than 0.001 by molar ratio with respect to platinum, the interaction among platinum, alkali metal and transition metal is weak. This is undesirable because the initiation temperature of nitrogen oxides reduction reaction is lowered or an active temperature range of the catalyst becomes narrow. When the amount of the alkali metal loaded exceeds 15 by molar ratio, the specific surface area diminishes presumably because the alkali metal loading destroys the structure of the carrier.

The amount of the transition metal loaded on the catalyst is preferably 3 by molar ratio or more with respect to platinum. When the molar ratio of the transition metal is less than 3 by molar ratio, the interaction among platinum, alkali metal and transition metal is weak. This is undesirable because the initiation temperature of nitrogen oxides reduction reaction is lowered or an active temperature range of the catalyst becomes narrow. The loading amount more than 50 by molar ratio is still effective but not more.

DETAILED DESCRIPTION OF PREFERRED EMBODIMENTS

Experiments Using $H_2$ as a Reducing Agent

Sixty (60) grams of silica sol containing 10% by weight of $SiO_2$ were added to 100 g of $NH_4^+$ type mordenite with a $SiO_2/Al_2O_3$ molar ratio of 70, and water was further added thereto to adjust the viscosity. The mixture was coated on a 400-mesh cordierite honeycomb carrier. The thus-obtained carrier was dried at 110° C., and then calcined in air at 500° C. for 1 hour. The total amount of the coating was 140 g per liter of the carrier. The carrier was dipped in a Pt-amine aqueous solution, and ion exchange was conducted for 1 hour. Then, the resulting carrier was dried in air at 110° C., and further calcined at 250° C. for 1 hour to obtain the intended catalyst No. 1.

Catalyst No. 1 was dipped in a barium acetate aqueous solution, and dried and calcined at 250° C. for 1 hour to obtain catalyst No. 2. In preparing catalyst No. 3, the same procedure as in obtaining catalyst No. 1 was repeated except that the mordenite was replaced with a silica powder, to obtain a catalyst loaded on a honeycomb carrier. Further, the same procedure as mentioned in the preparation of catalyst No. 1 was performed to load platinum on the carrier. Then, the thus-obtained carrier was dipped in a magnesium nitrate aqueous solution to obtain catalyst No. 3 having magnesium loaded thereon. Platinum/alumina catalyst No. 4 was prepared in the same manner as in obtaining catalyst No. 1 except that an alumina sol was used instead of the silica sol. The composition of each sample catalyst prepared above is shown in Table 1.

TABLE 1

| Sample No. | Loading per Liter of Catalyst | | | Carrier |
| | Pt | Ba | Mg | |
| --- | --- | --- | --- | --- |
| No. 1 | 2.0 g | — | — | mordenite |
| No. 2 | 2.0 g | 3.4 g | — | mordenite |
| No. 3 | 2.0 g | — | 1.3 g | silica |
| No. 4 | 2.0 g | — | — | γ-alumina |

EXAMPLE 1

A model gas having a composition shown in Table 2 and further containing a predetermined amount (0 to 1 vol %) of $H_2$ was fed through a catalyst having a diameter of 30 mm and a length of 50 mm at a rate of 25 liters/min to examine a $NO_x$ conversion efficiency at the inlet gas temperature of 120° C.

TABLE 2

| Composition of Model Gas | |
| Component | Concentration |
| --- | --- |
| NO | 0.2 vol % |
| $O_2$ | 6 vol % |
| $H_2O$ | 6 vol % |
| $N_2$ | balance |

The results are shown in FIG. 1. From these results, it is found that the $NO_x$ conversion efficiency relative to the $H_2$/NO ratio increases non-linearly. At 4 or more of the $H_2$/NO ratio, the $NO_x$ conversion efficiency is saturated and as the amount of $H_2$ further increases, the $NO_x$ conversion efficiency tends to decrease. This is because the temperature induced by the chemical reaction in the catalyst becomes too high.

EXAMPLE 2

$H_2$ was fed continuously in one case, and it was fed intermittently at such a cycle of 4 seconds in the other case, where $H_2$ was fed for 2 seconds and the feeding of $H_2$ was shut off for another 2 seconds. The time-averaged feeding amount of $H_2$ was set to be equal between both cases. An average $NO_x$ conversion ratio was measured in each case, and the results are shown in Table 3.

TABLE 3

| | NO$_x$ conversion ratio (%) | | | | | |
|---|---|---|---|---|---|---|
| | H$_2$/NO = 0.4 (time-averaged molar ratio) | | H$_2$/NO = 0.6 (time-averaged molar ratio) | | H$_2$/NO = 1.0 (time-averaged molar ratio) | |
| Sample No. | Continuous | Intermittent | Continuous | Intermittent | Continuous | Intermittent |
| 1 | 1 | 7 | 2 | 12 | 20 | 38 |
| 2 | 1 | 7 | 2 | 16 | 18 | 56 |
| 3 | 0 | 3 | 1 | 14 | 14 | 50 |
| 4 | 0 | 2 | 0 | 10 | 8 | 36 |

The results in Table 3 reveal that at any H$_2$/NO ratio, a higher NO$_x$ conversion ratio is obtained in the intermittent feeding than in the continuous feeding, and that when H$_2$ is fed in an amount larger than NO, a higher NO$_x$ conversion ratio is obtained in intermittent feeding.

Figure 2:
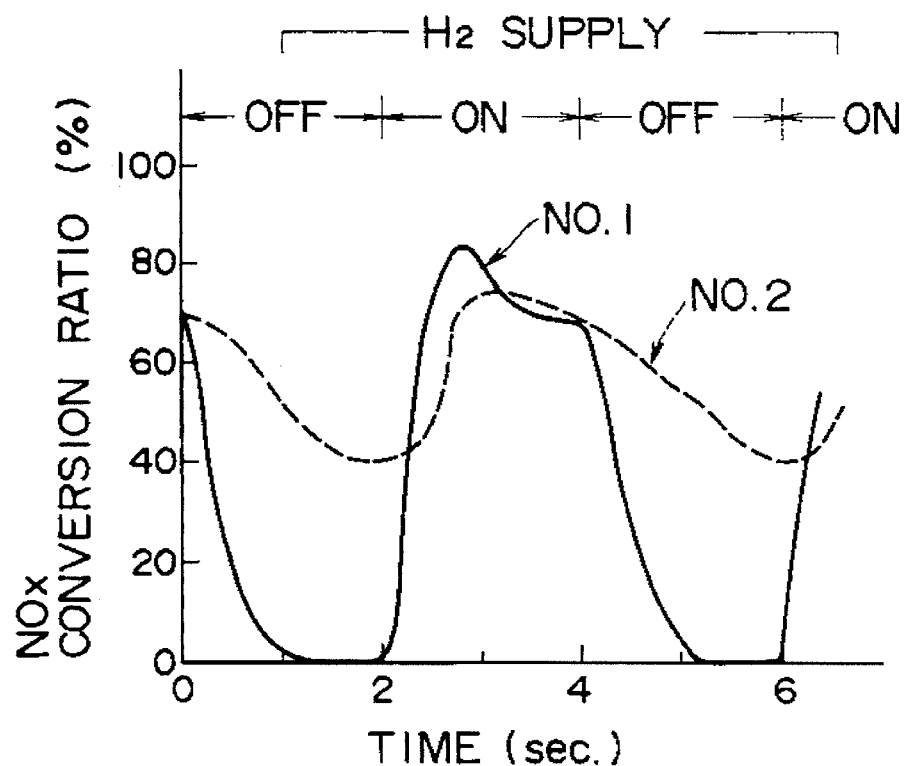
FIG. 2 is a graph showing a $NO_x$ conversion ratio when $H_2$ as a reducing agent is intermittently fed to a catalyst.

A NO$_x$ conversion ratio at H$_2$/NO=1 is shown in FIG. 2. In FIG. 2, Sample No. 2 which is a catalyst having Ba loaded thereon shows a high NO$_x$ conversion ratio even at the off-time of H$_2$.

EXAMPLE 3

An engine having a stroke volume of 1.6 liters was run at 1,500 rpm as mentioned below to measure a NO$_x$ conversion efficiency through an engine test.

Figure 3:
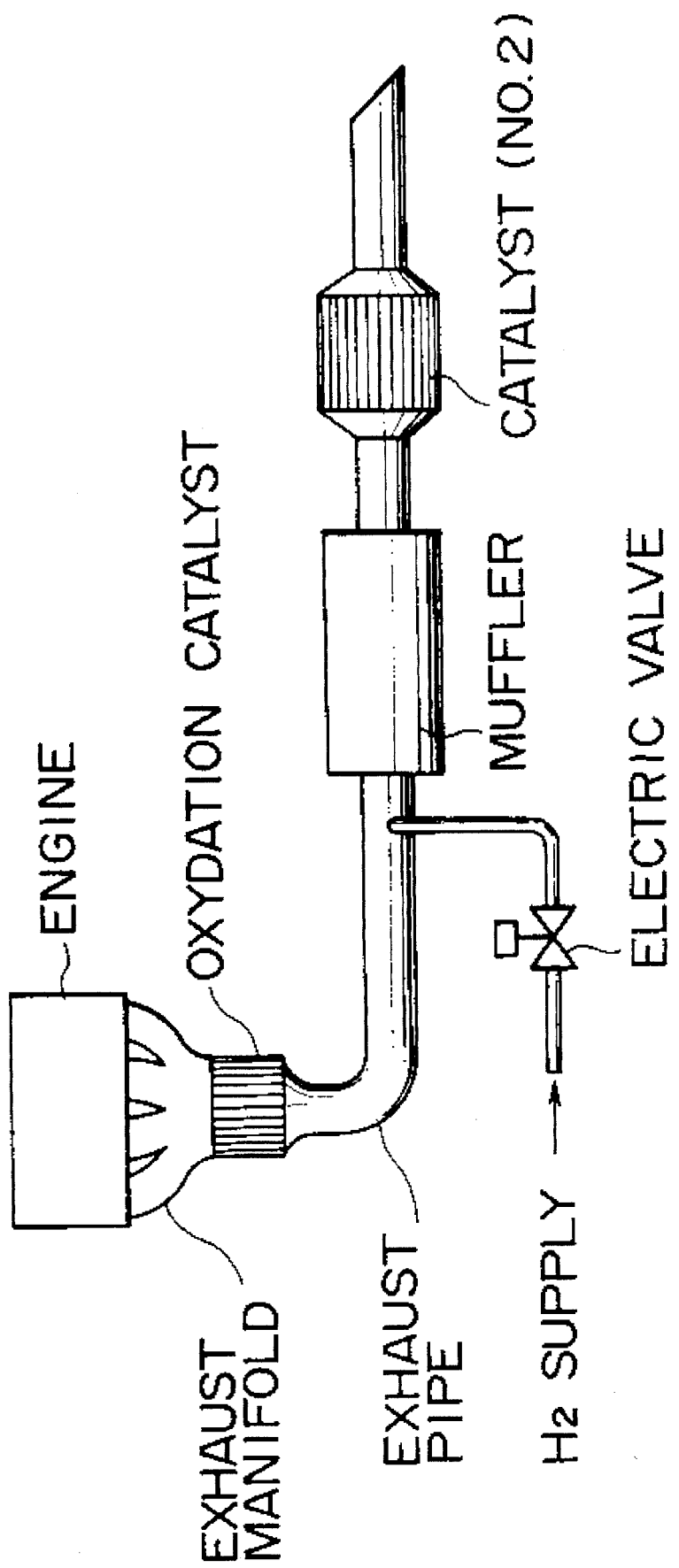
FIG. 3 is a schematic diagram showing the structure of an evaluation test apparatus in an engine test.

An oxidation catalyst (0.5 liter) having 3 g/liter of Pd loaded thereon was disposed in the middle of an exhaust gas passage (pipe), and hydrogen was fed from downstream thereof. An electromagnetic valve was disposed in the middle of a hydrogen feeding passage such that the hydrogen gas could be fed either continuously or intermittently. A muffler was disposed on an exhaust gas passage downstream of a hydrogen feeding inlet, so that hydrogen could be mixed with the exhaust gas therein. Further downstream of the muffler, a catalytic converter containing 1.3 liters of catalyst No. 2 was located. The structure of the apparatus used in this engine test is shown in FIG. 3.

Using the above-mentioned apparatus, the gas passing through the catalyst was analyzed with a gas analyzer. The exhaust gas had the composition shown in Table 4. The feeding rate of an exhaust gas was 480 liters/min, and the inlet gas temperature of catalyst No. 2 was 120° C.

TABLE 4

| Composition of Exhaust Gas | |
|---|---|
| Component | Concentration |
| NO$_x$ | 0.13 vol % |
| CO, HO | <0.01 vol % |
| O$_2$ | 4.2 vol % |

According to the above-mentioned test, the NO$_x$ conversion ratio was 47% when hydrogen was continuously fed at a rate of 1 liter/min, and the average NO$_x$ conversion ratio was 64% when hydrogen was fed intermittently in such a cycle that hydrogen was fed for 1 second at a rate of 3 liters/min and the feeding of hydrogen was suspended for 2 seconds. This proves that when hydrogen is fed at 1 liter/min of average feeding rate, the intermittent feeding gives a higher NO$_x$ conversion efficiency than the continuous feeding.

Experiment Using CO As a Reducing Agent

A silicon dioxide (SiO$_2$) powder as a carrier was dipped into a predetermined concentration of a sodium acetate aqueous solution, dried by evaporating the impregnant, and then calcined at 500° C. for 5 hours to deposit 0.11% by weight of sodium on the carrier. Further, the thus-obtained catalyst was dipped into a predetermined amount of an ammonium molybdate aqueous solution which was adjusted to have 12.3% by weight of molybdenum (Mo) loading as MoO$_3$, dried by evaporating the impregnant, and then calcined at 700° C. for 3 hours to obtain an Mo—Na metal loaded catalyst. The resulting catalyst was dipped into a dinitrodiamine platinum aqueous solution which was adjusted to have 1.7% by weight of platinum (Pt) loading, dried by evaporating the impregnant, and then calcined at 500° C. for 5 hours to prepare catalyst No. 5.

EXAMPLE 4

A NO$_x$ conversion efficiency was measured by feeding a model gas having the composition shown in Table 5 through catalyst No. 5 loading 0.11 wt % of Na, 12.3 wt % of Mo and 1.7 wt % of Pt with respect to SiO$_2$.

TABLE 5

| Composition of Model Gas | |
|---|---|
| Component | Concentration |
| NO | 0.12 vol % |
| O$_2$ | 4.3 vol % |
| CO | 0–0.72% |

Figure 4:
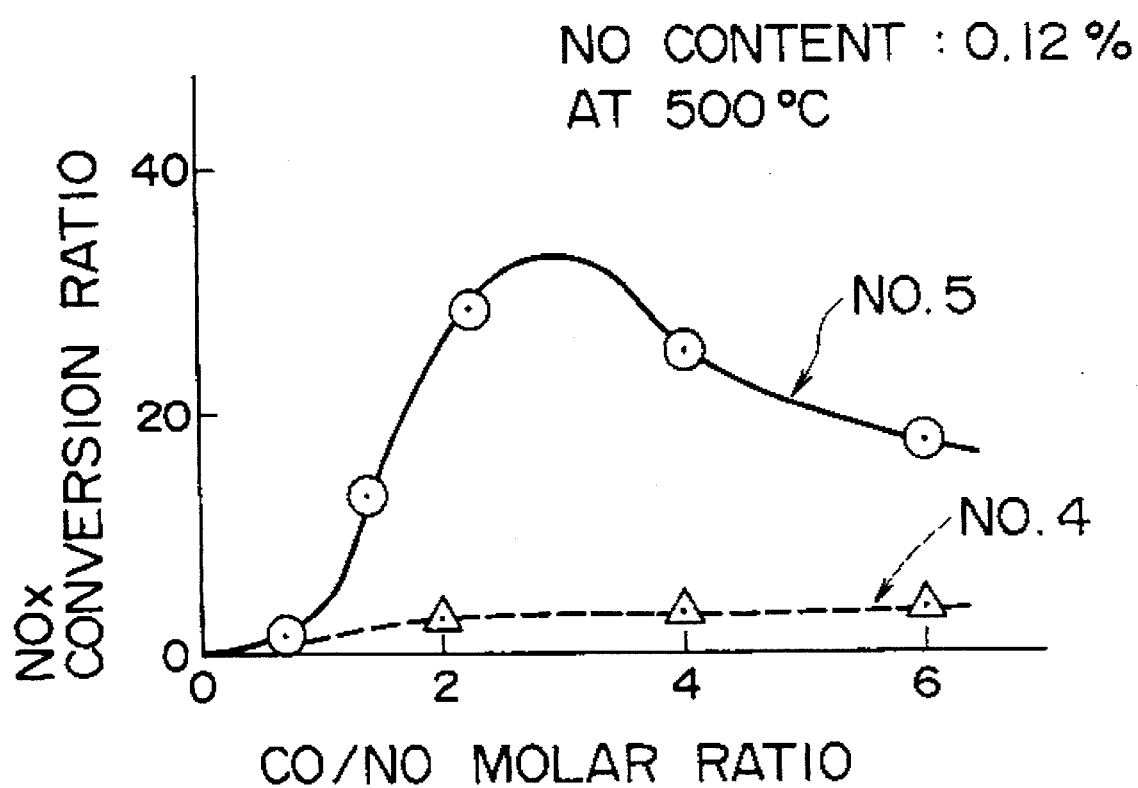
FIG. 4 is a graph showing a $NO_x$ conversion ratio relative to a CO/NO ratio.

The results are shown in FIG. 4. FIG. 4 shows that the NO$_x$ conversion ratio non-linearly increases with respect to the CO/NO ratio in the same way as when H$_2$ is used as the reducing agent. Further, in FIG. 4, when the CO/NO ratio is 4 or more, the NO$_x$ conversion ratio tends to decrease. This is because the temperature of the catalyst layers increases due to the burning of CO.

EXAMPLE 5

Using catalyst No. 5 and catalyst No. 4, a NO$_x$ conversion ratio were measured, the inlet gas temperature being 500° C. and the CO/NO ratio being 2. Here, CO was fed continuously or intermittently at a cycle of 8 seconds such that CO was fed for 4 seconds and feeding of CO was suspended for another 4 seconds. The results are shown in Table 6.

TABLE 6

| | NO$_x$ conversion ratio (%) | |
|---|---|---|
| | NO$_x$ conversion ratio (%) | |
| | Catalyst No. 5 | Catalyst No. 4 |
| Continuous | 25 | 3 |
| Intermittent | 42 | 5 |

The results in Table 6 reveal that the intermittent feeding can give a higher NO$_x$ conversion ratio than the continuous feeding. Further, the catalyst loading Na and Mo in addition is superior in NO$_x$ conversion efficiency to the catalyst without addition of them.

EXAMPLE 6

Using catalyst No. 5, a NO$_x$ conversion efficiency was measured in the same manner as in Example 5 except that an $H_2/CO$ mixed gas ($H_2/CO=1$) was used instead of CO and the inlet gas temperature was 400° C. Here, the molar ratio of CO, $H_2$ and NO satisfied the equation of $(CO+H_2)/NO=2$. The results are shown in Table 7.

TABLE 7

| | $NO_x$ conversion ratio (%) |
|---|---|
| | $NO_x$ conversion ratio (%) |
| Continuous | 28 |
| Intermittent | 51 |

From the results in Table 7, it becomes apparent that even when the H2/CO mixed gas was used as the reducing oxides, the intermittent feeding can give a higher $NO_x$ conversion ratio than the continuous feeding.

What is claimed is:

1. A process for reducing nitrogen oxides in exhaust gases including excess oxygen, the amount of which is larger than a stoichiometric amount of oxygen required to oxidize components to be oxidized in said exhaust gases, comprising the steps of:

i) bringing said exhaust gases into contact with a catalyst for reducing nitrogen oxides; and ii) reducing said nitrogen oxides by intermittently introducing a reducing agent for reducing nitrogen oxides to said reducing catalyst, wherein said reducing catalyst comprises a porous carrier of at least one material selected from the group consisting of silica, zeolite and alumina, and platinum loaded thereon, said reducing agent is selected from the group consisting of hydrogen ($H_2$) and carbon monoxide (CO), and said reducing agent is intermittently introduced in a manner to satisfy the following equation:

$[NO_x]<[H_2]+[CO]$, wherein $[H_2]$, $[CO]$ and $[NO_x]$ are molar concentrations in said exhaust gases of hydrogen, carbon monoxide and nitrogen oxides, respectively.

2. A process for reducing nitrogen oxides according to claim 1, wherein said reducing catalyst further comprises at least one metal selected from the group consisting of alkali metals and alkaline earth metals.

3. A process for reducing nitrogen oxides according to claim 2, wherein said at least one metal is included in the range of from 0.001 to 15 by molar ratio with respect to said platinum.

4. A process for reducing nitrogen oxides according to claim 2, wherein said alkali metal is at least one metal selected from the group consisting of lithium, sodium, potassium, and rubidium, and said alkaline earth metal is at least one metal selected from the group consisting of magnesium, calcium, strontium and barium.

5. The process for reducing nitrogen oxides according to claim 1, wherein said reducing catalyst further comprises an oxidation inhibitor for suppressing the oxidation of said platinum.

6. A process for reducing nitrogen oxides according claim 5, wherein said reducing catalyst further comprises at least one metal selected from the group consisting of alkali metals and alkaline earth metals.

7. A process for reducing nitrogen oxides according to claim 6, wherein said alkali metal is at least one metal selected from the group consisting of lithium, sodium, rubidium, and potassium and said alkaline earth metal is at least one metal selected from the group consisting of magnesium, calcium, strontium and barium.

8. A process for reducing nitrogen oxides according to claim 6, wherein said at least one metal is included in the range of from 0.001 to 15 by molar ratio with respect to said platinum.

9. A process for reducing nitrogen oxides according to claim 5, wherein said oxidation inhibitor comprises an alkali metal and a transition metal.

10. A process for reducing nitrogen oxides according to claim 9, wherein said transition metal is molybdenum.

11. A process for reducing nitrogen oxides according to claim 9, wherein said alkali metal is included in the range of from 0.001 to 15 by molar ratio with respect to said platinum.

12. A process for reducing nitrogen oxides according to claim 9, wherein said transition metal is included in the range of not less than 3 by molar ratio with respect to said platinum.

13. A process for reducing nitrogen oxides according to claim 9, wherein said alkali metal is at least one element selected from the group consisting of lithium, sodium, rubidium and potassium.

* * * * *